United States Patent [19]

Benoit et al.

[11] Patent Number: 4,817,008

[45] Date of Patent: Mar. 28, 1989

[54] METHOD OF REGULATING A CEMENT MANUFACTURING INSTALLATION

[75] Inventors: Philippe Benoit, Lambersart; Alain Chielens, Mouvaux; Andre Pinoncely, Villeneuve d'Ascq; Florence Osselin, Lille, all of France

[73] Assignee: Fives-Cail Babcock, La Courneuve, France

[21] Appl. No.: 57,171

[22] Filed: Jun. 2, 1987

[30] Foreign Application Priority Data

Jun. 4, 1986 [FR] France ................................ 86 08032

[51] Int. Cl.$^{4}$ ......................... G06F 15/46; F27B 15/00

[52] U.S. Cl. .................................... 364/477; 364/172; 364/503; 432/17; 432/45

[58] Field of Search ............... 364/477, 172, 498, 500, 364/503; 432/17, 37, 42, 45, 47, 48; 110/186, 188, 190

[56] References Cited

U.S. PATENT DOCUMENTS 3,566,091 2/1971 Bay .................................... 432/45 X
3,595,544 7/1971 Curtis et al. ....................... 432/45 X
3,888,621 6/1975 Williams ........................... 432/45 X
4,022,569 5/1977 Farago et al. ..................... 432/17 X
4,430,719 2/1984 Pearson ................................ 364/503
4,716,532 12/1987 Benoit et al. ......................... 364/477

*Primary Examiner*—Joseph Ruggiero

*Attorney, Agent, or Firm*—Kurt Kelman

[57] ABSTRACT

To enable the operation of a cement manufacturing installation to be controlled by taking into account changes in essential operating parameters as soon as they appear, the quantity of the total theoretical heat (QT) required to convert the raw material to clinker is calculated by applying correcting coefficients to the quantity of a predetermined total nominal heat (QTO) corresponding to nominal values imposed by parameters (K1, K2, . . . Kn) characteristic of the raw material, of the fuel, of the clinker and of the operation of the installation, the correcting coefficients taking into account differences between the nominal values and measured values of said parameters. The quantity of the theoretical heat (QF) to be supplied to the kiln is calculated by deducting the quantity of heat (QP) supplied to the precalcination chamber from the quantity of total theoretical heat (QT). A consigned value (FF1) of flow of the fuel supplied to the kiln is calculated on the basis of the quantity of the theoretical heat (QF) to be supplied to the kiln, and the actual consigned value (FFO) of the flow control is progressively modified until it has reached the calculated consigned value (FF1) of fuel flow, the progress of variations imposed on the consigned value depending on the conditions of thermal treatment of the raw material and of its dwell time in the kiln. These steps are periodically repeated at relatively close intervals of time.

3 Claims, 2 Drawing Sheets

METHOD OF REGULATING A CEMENT MANUFACTURING INSTALLATION

Figure 1:
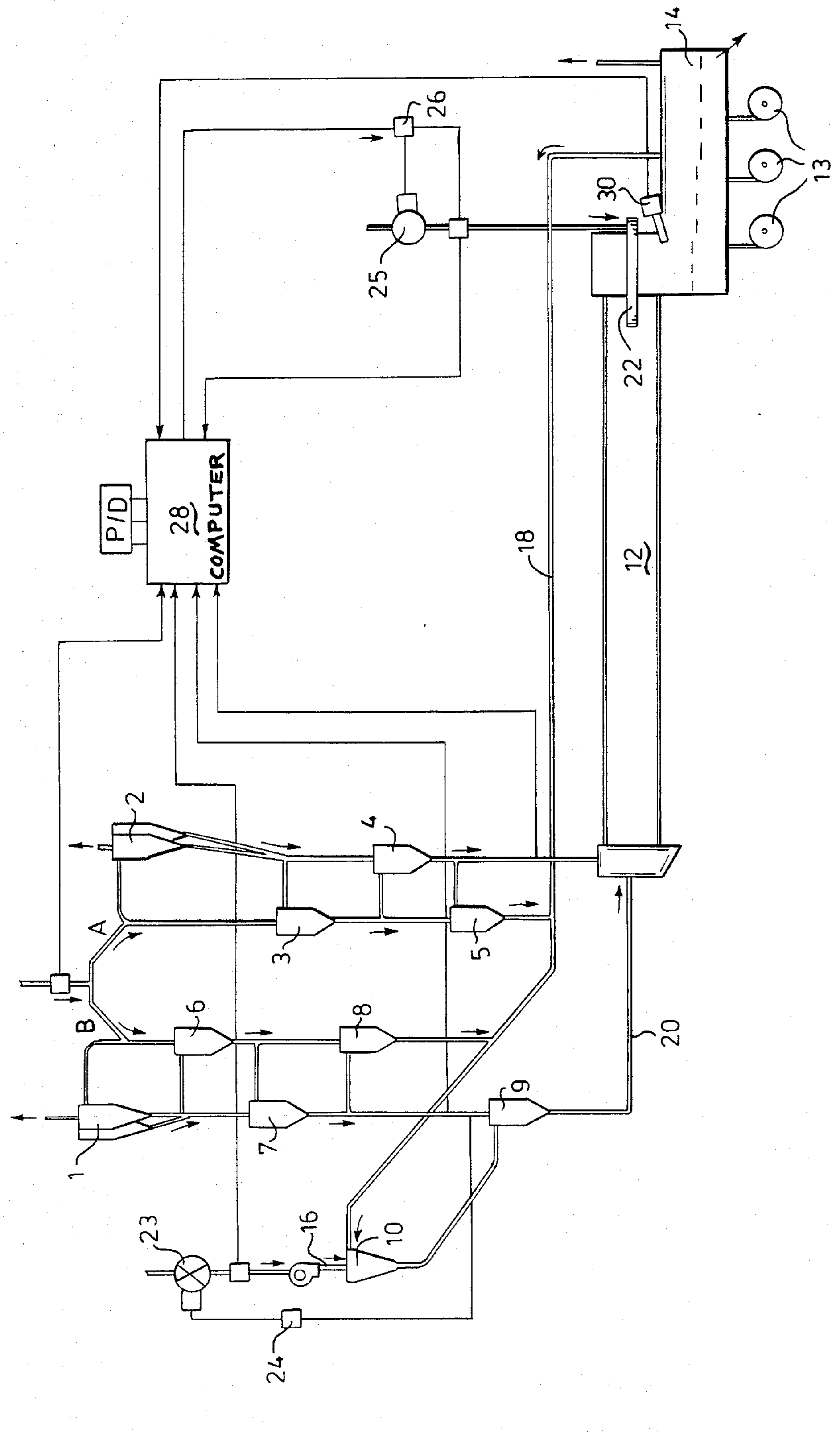

The present invention relates to a method of regulating a cement manufacturing installation comprising a precalcination chamber where a raw material is at least partially decarbonized, a rotary tubular kiln equipped with a burner at a discharge end for clinker, a heat exchanger where the raw material is preheated by flue gases coming from the kiln and the precalcination chamber, and a cooler for the clinker, Such cement manufacturing installations usually also have flow controls for fuel fed to the precalcination chamber and to the kiln to maintain certain operating parameters equal to their consigned values. In particular, it has been proposed to regulate the flow of fuel supplied to the precalcination chamber so that the rate of precalcination of the raw material discharged from the chamber remains constant, and to regulate the fuel supply to the burner of the kiln so as to maintain a representative magnitude of the quality of the clinker at a consigned value, which generally is the temperature in the clinkerization zone of the kiln.

If a modification of the operating conditions occurs upstream of the installation, resulting from an accidental disturbance or an operator's signal, the imposed quality of the clinker may be conversed only by also modifying the operating conditions of the kiln, particularly the quantity of the supplied heat. However, the flow control for the fuel supplied to the kiln receives information of these modifications only after a relatively long delay equal to the time elapsed between the entry of the material into the kiln and its movement to the clinkerization zone, and responds thereto only at that delayed moment. The material introduced into the kiln during this time lapse will not be subjected to the normal treatment conditions and the clinker produced from this material will not have the desired quality.

It is the primary object of this invention to make it possible to take into account modifications of the essential operating parameters of the installation as soon as they occur to determine the consigned value of the fuel flow.

The above and other objects are accomplished according to the invention with a method of regulating a cement manufacturing installation, which comprises the steps of calculating the quantity of the total theoretical heat (QT) required to convert the raw material to clinker by applying to the quantity of a predetermined total nominal heat, (QTO) corresponding to nominal values imposed on parameters (K1, K2, . . . Kn) characteristic of the raw material, the fuel, the clinker and the operation of the installation, correcting coefficients taking into account differences between the nominal values and measured values of said parameters, calculating the quantity of the theoretical heat (QF) to be supplied to the kiln by deducting the quantity of heat (QP) supplied to the precalcination chamber from said quantity of total theoretical heat (QT), calculating a consigned value (FF1) of flow of the fuel supplied to the kiln on the basis of the quantity of the theoretical heat (QF) to be supplied to the kiln, progressively modifying the actual consigned value (FF0) of the flow control until it has reached the calculated consigned value (FF1) of fuel flow, the progress of variations imposed on the consigned value depending on the conditions of thermal treatment of the raw material and of its dwell time in the kiln, and periodically repeating said steps at relatively close intervals of time.

The quantity of heat (QP) supplied to the precalcination chamber may be calculated on the basis of a quantity of a predetermined nominal theoretical heat (QPO) and correcting coefficients taking into account the differences between the measured values and nominal values of the characteristic parameters (K1, K2, . . . Kn).

The consigned value (FF1) of flow of the fuel supplied to the kiln may be corrected in response to a difference between the measured value thereof and the consigned value of a representative magnitude of the quality of the clinker. This correction may be effected according to the method disclosed and claimed in copending U.S. application Ser. No. 838,146, filed Mar. 10, 1986 U.S. Pat. No. 4,716,532.

The progressive modification of the consigned value of the flow control of the fuel supplied to the kiln may be effected by sending to the control a signal proportional to the calculated consigned value and distributed to the control by a function which permits taking into account the thermal history of the material in the kiln, for example by means of a filter of the second order.

Figure 2:
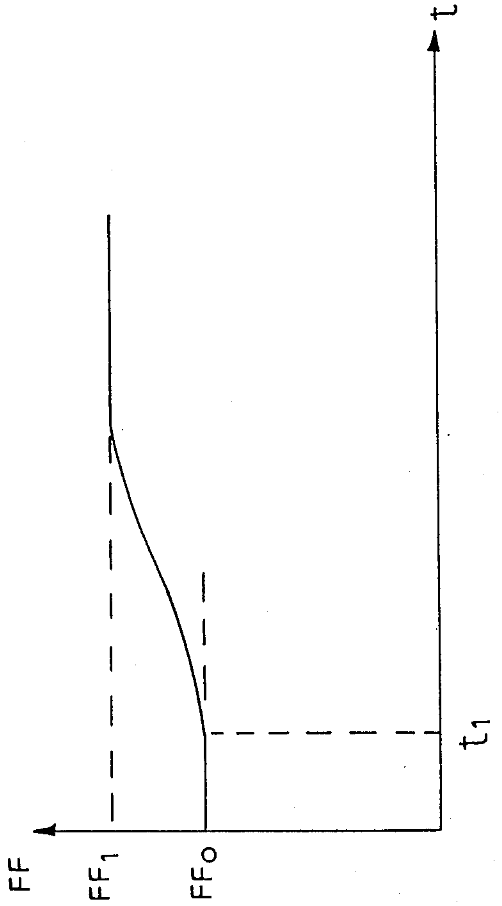

The above and other objects, advantages and features of the present invention will become more apparent from the following detailed description of a now preferred embodiment thereof, taken in conjunction with the accompanying, generally diagrammatic drawing wherein FIG. 1 is a diagram of a cement clinker manufacturing installation equipped with a control system for the operation regulating method of this invention; and FIG. 2 shows a curve of the variations of the consigned value of the fuel flow control in relation to the time.

Referring now to FIG. 1, the drawing shows a generally conventional manufacturing installation comprising heat exchanger cyclones 1 to 8, precalcination chamber 10 to the discharge end of which cyclone 9 is connected, rotary tubular kiln 12 receiving the precalcined raw material from cyclone 9 through supply conduit 20 at an input end of the kiln, and cooler 14 for the clinker discharged from a discharge end of the kiln opposite the input end. The heat exchanger cyclones are interconnected by conduits shown in heavy lines and the flow of the material between the cyclones is indicated by arrows. The illustrated heat exchanger for preheating the raw material is comprised of a first set of cyclones 2, 3, 4 and 5 which are traversed by the hot flue gases coming from kiln 12 countercurrently to the flow of the raw material, and a second set of cyclones 1, 6, 7 and 8 which are traversed by the flue gases coming from precalcination chamber 10 also countercurrently to the flow of the raw material.

The finely milled raw material is introduced into the heat exchanger in the upper stages of the two sets of cyclones at A and B, is preheated by the flue gases coming from the kiln and the precalcination chamber, and the preheated raw material is then introduced into precalcination chamber 10 where it is partially decarbonized. The heat required for this reaction is furnished by the combustion of a mixture of a fuel injected into the chamber by means of tuyere 16 and air removed from cooler 14 and introduced into the chamber by conduit 18.

The partially decarbonized raw material flows from precalcination chamber 10 into cyclone 9 where it is separated from the flue gases and introduced through conduit 20 into kiln 12.

In the kiln, the precalcined raw material is displaced slowly from the input to the discharge end countercurrently to the hot gases produced by burner 22 and is fully calcined and clinkerized. The clinker discharged from the kiln is cooled in cooler 14 by means of fresh air supplied to the cooler by blowers 13, and the cooling air is subsequently used as combustion air in the kiln and in the precalcination chamber.

The control circuit for operating the installation is indicated by broken lines. The control circuit comprises control 24 maintaining the temperature of the gases downstream of precalcination chamber 10 equal to a consigned value by acting on the flow of fuel supplied to the chamber through flow control valve 23. The object of this control is to obtain a good stability of the rate of decarbonization of the raw material discharged from the precalcination chamber. The temperature of the gases downstream of chamber 10 is, in effect, a good indicator of the rate of decarbonization.

The flow of fuel supplied to burner 22 is regulated y control 26 which receives its consigned value from computer 28. This consigned value is periodically calculated at very close intervals of time (for example, every 10 seconds) by computer 28, on the basis of values of a large number of operating parameters measured or entered by an operator, such as the flow or throughput of the clinker, characteristics of the crude raw material and of the precalcined raw material, characteristics of the fuel, the content of oxygen in the flue gases, etc.

At each calculating step, the computer first determines the quantity of the total theoretical heat (QT) required to be supplied to the installation, per unit of time, to convert the crude raw material to clinker, by the use of the following formula:

$$QT = QTO \times f1(K1) \times f2(K2) \ldots fi(Ki) \ldots fn(Kn).$$

In this formula, K1, K2, . . . Kn are such parameters as are characteristic of the raw material or the clinker, the rate of decarbonization of the raw material discharged from the precalcination chamber, the content of free lime in the clinker, the amount of fuel ashes, the proportion of each fuel if several fuels are used, the content of oxygen in the flue gases of the kiln and of the precalcination chamber, and other operating characteristics. QTO is the quantity of a predetermined total nominal heat corresponding to nominal values imposed on these parameters. This quantity is predetermined either by experimentation or by a mathematical model stored in the computer. Functions f1(K1), f2(K2), . . . fn(Kn) are correcting coefficients which take into account differences between the nominal values and values of these parameters measured at every step of the calculation. These functions are pre-established and the nominal values of the parameters are stored in the computer.

The computer then determines the calorific consumption (QP) of the precalcination chamber, which may be calculated on the basis of the measured quantity of heat supplied thereto. If desired, it may also be calculated by a formula analogous to that serving to calculate QT, i.e.:

$$QP = QPO \times g1(K1) \times g2(K2) \ldots gi(Ki) \ldots gn(Kn).$$

The quantity of heat required by the kiln is then calculated by establishing the difference between QT and QP, and the obtained value is optionally corrected in response to the value of the output signal of a regulator PID incorporated into the computer and which receives an input signal corresponding to the measurement of a parameter representative of the quality of the clinker, such as, in particular, the apparent temperature of the clinker discharged from the kiln and measured by device 30 for measuring the calorific energy radiated by the clinker, as disclosed in the above-mentioned patent application. On the basis of the quantity of heat QF thus obtained, the computer determines consigned value FF for the flow of the fuel supplied to burner 22 through flow control valve 25.

A signal proportional to calculated consigned value FF is sent to control 26 at controlled time intervals, for example through a time filter or any other means of time-bound signal distribution, to assure that the eventual modification of the consigned value of the control is progressive and spreads over a period of time corresponding approximately to the dwell time of the material in the kiln.

FIG. 2 diagrammatically illustrates the variation of the consigned value of burner fuel flow control 26. The initial consigned value is FFO. At moment t1, the calculated value is FF1. Beginning with moment t1, the consigned value of the control grows progressively until it has reached value FF1 at the end of a period of time having the same order of magnitude as the dwell time of the material in the kiln. It has been assumed that the calculated consigned value remained equal to FF1 during the entire period considered. Contrariwise, the curve would be modified to take into account the new calculated value.

What we claim is:

1. A method of regulating a cement manufacturing installation comprising a precalcination chamber where a raw material is at least partially decarbonized, a rotary tubular kiln equipped with a burner at a discharge end for clinker, and a flow control for fuel fed to the burner, which comprises the steps of (a) calculating the quantity of the total theoretical heat (QT) required to convert the raw material to clinker by applying correcting coefficients to the quantity of a predetermined total nominal heat (QTO) corresponding to nominal values imposed on parameters (K1, K2, . . . Kn) characteristic of the raw material, of the fuel, of the clinker and of the operation of the installation, the correcting coefficients taking into account differences between the nominal values and measured values of said parameters, (b) calculating the quantity of the theoretical heat (QF) to be supplied to the kiln by deducting the quantity of heat (QP) supplied to the precalcination chamber from said quantity of total theoretical heat (QT), (c) calculating a consigned value (FF1) of flow of the fuel supplied to the kiln on the basis of the quantity of the theoretical heat (QF) to be supplied to the kiln, (d) progressively modifying the actual consigned value (FF0) of the flow control until it has reached the calculated consigned value (FF1) of fuel flow, the progress of variations imposed on the consigned value depending on the conditions of thermal treatment of the raw material and of its dwell time in the kiln, and (e) periodically repeating said steps of relatively close intervals of time.

2. The method of claim 1, comprising the further step of calculating the quantity of heat (QP) supplied to the precalcination chamber on the basis of a quantity of a predetermined nominal theoretical heat (QPO) and correcting coefficients taking into account the differences between the measured values and nominal values of the characteristic parameters (K1, K2, . . . Kn).

3. The method of claim 1, comprising the further step of correcting the consigned value (FF1) of flow of the fuel supplied to the kiln in response to a difference between the measured value thereof and the consigned value of a representative magnitude of the quality of the clinker.

* * * * *